(12) United States Patent
Boursier (10) Patent No.: US 9,393,745 B2
(45) Date of Patent: Jul. 19, 2016

(54) OVER-MOLDING OF LOAD-BEARING COMPOSITE STRUCTURES

(75) Inventor: Bruno Boursier, Dublin, CA (US)

(73) Assignee: Hexcel Corporation, Dublin, CA (US)

( * ) Notice: Subject to any disclaimer, the term of this patent is extended or adjusted under 35 U.S.C. 154(b) by 240 days.

(21) Appl. No.: 13/471,492

(22) Filed: May 15, 2012

(65) Prior Publication Data

US 2013/0309435 A1  Nov. 21, 2013

(51) Int. Cl.
*B32B 3/24* (2006.01)
*B29C 70/06* (2006.01)
*B29C 70/10* (2006.01)
(Continued)

(52) U.S. Cl.
CPC ............ *B29C 70/545* (2013.01); *B29C 69/001* (2013.01); *B29C 70/68* (2013.01); *B29C 70/745* (2013.01); *B29C 70/84* (2013.01); *B29C 69/00* (2013.01); *B29C 70/081* (2013.01); *B29C 70/088* (2013.01); *B29C 70/10* (2013.01); *B29C 70/12* (2013.01); *B29C 70/16* (2013.01); *B29C 70/20* (2013.01); *B29C 70/682* (2013.01); *B29C 70/74* (2013.01); *B29C 70/742* (2013.01); *B29C 70/76* (2013.01); *B29C 70/763* (2013.01); *B29C 70/88* (2013.01); *Y02T 50/433* (2013.01); *Y10T 29/49826* (2015.01); *Y10T 428/17* (2015.01); *Y10T 428/19* (2015.01); *Y10T 428/24322* (2015.01); *Y10T 428/24339* (2015.01); *Y10T 428/24347* (2015.01); *Y10T 428/24777* (2015.01); *Y10T 428/24994* (2015.04); *Y10T 428/24995* (2015.04);
(Continued)

(58) Field of Classification Search
CPC .................. B29C 66/72141; B29C 66/72143; B29C 66/7214; B29C 66/72; B29C 70/081; B29C 70/84; B29C 66/304; B29C 45/14475; B29C 45/14508; B29C 65/70; B29C 70/845; B29C 70/76; B29C 70/763; B29C 70/745; B29C 70/74
See application file for complete search history.

(56) References Cited

U.S. PATENT DOCUMENTS 2,588,570 A * 3/1952 Pitcairn ................. B64C 27/473
156/214
3,096,958 A * 7/1963 Koontz .................... B29C 69/02
244/123.3
(Continued)

FOREIGN PATENT DOCUMENTS

DE   102006012699 A1 * 9/2007 .............. B29C 70/16
DE   102007023836 A1 * 11/2008 .............. B29C 65/56
(Continued)

OTHER PUBLICATIONS

Machine Translation of JP 2008200866 A, Sep. 2008.*
(Continued)

*Primary Examiner* — Jeff Vonch
(74) *Attorney, Agent, or Firm* — W. Mark Bielawski; David J. Oldenkamp (57) ABSTRACT

A load-bearing composite structure for connection to a support body or structure. The load-bearing structure includes a load-bearing element that is made up of continuous reinforcing fibers and a resin matrix. The load-bearing element has an attachment portion for connection to the support body. The load-bearing composite structure further includes a connection element that is formed using a molding material which is composed of discontinuous fibers and a resin matrix. The molding material is molded over the surface of the attachment portion of the load-bearing element.

18 Claims, 4 Drawing Sheets

(51) Int. Cl.
*B29C 70/12* (2006.01)
*B29C 70/76* (2006.01)
*B29C 69/00* (2006.01)
*B29C 70/54* (2006.01)
*B29C 70/84* (2006.01)
*B29C 70/08* (2006.01)
*B29C 70/16* (2006.01)
*B29C 70/20* (2006.01)
*B29C 70/22* (2006.01)
*B29C 70/68* (2006.01)
*B29C 70/74* (2006.01)
*B29C 70/88* (2006.01)

(52) U.S. Cl.
CPC ............... *Y10T 428/249923* (2015.04); *Y10T 428/249942* (2015.04); *Y10T 428/249945* (2015.04)

(56) References Cited

U.S. PATENT DOCUMENTS

| | | | | |
|---|---|---|---|---|
| 3,731,360 | A * | 5/1973 | Stone, Jr. | B23P 15/04 29/889.71 |
| 3,737,250 | A * | 6/1973 | Pilpel | F01D 5/282 416/219 R |
| 3,950,115 | A * | 4/1976 | Euler | B29C 70/083 244/123.6 |
| 4,041,031 | A * | 8/1977 | Heasman | 264/250 |
| 4,786,347 | A * | 11/1988 | Angus | 156/172 |
| 5,022,824 | A * | 6/1991 | Violette | B64C 11/008 416/230 |
| 5,086,997 | A * | 2/1992 | Glass | 244/123.3 |
| 5,139,405 | A * | 8/1992 | Krone et al. | 425/116 |
| 5,151,322 | A * | 9/1992 | Kimoto et al. | 428/299.1 |
| 5,474,635 | A * | 12/1995 | Jacob | B29C 37/0082 156/163 |
| 5,667,881 | A * | 9/1997 | Rasmussen | B29C 66/1122 156/308.2 |
| 5,855,709 | A * | 1/1999 | Bocoviz | B29C 70/48 156/308.2 |
| 6,354,577 | B1 | 3/2002 | Quintile | A47C 23/002 267/149 |
| 6,406,009 | B1 * | 6/2002 | Constantinescu | A47C 23/02 267/110 |
| 7,357,460 | B2 * | 4/2008 | Schlanger | B60B 1/0261 301/104 |
| 7,445,836 | B2 * | 11/2008 | Yamane et al. | 428/297.4 |
| 7,695,661 | B2 | 4/2010 | Callis | |
| 7,754,323 | B2 * | 7/2010 | Murai | B29C 43/003 264/331.11 |
| 7,960,674 | B2 | 6/2011 | Boursier et al. | |
| 8,173,238 | B2 * | 5/2012 | Okano | B29C 45/14311 428/58 |
| 8,453,972 | B2 * | 6/2013 | Billinger | B64C 9/02 244/123.1 |
| 2004/0175533 | A1 * | 9/2004 | Yamane et al. | 428/91 |
| 2005/0236524 | A1 * | 10/2005 | Sarh | 244/124 |
| 2007/0124912 | A1 * | 6/2007 | De Traglia Amancio Filho | B29C 66/14 29/447 |
| 2008/0081170 | A1 * | 4/2008 | Tilbrook et al. | 428/292.1 |
| 2009/0011247 | A1 * | 1/2009 | Barlow et al. | 428/413 |
| 2009/0208721 | A1 * | 8/2009 | Tsuchiya | B29C 45/14786 428/220 |
| 2010/0178495 | A1 * | 7/2010 | Taketa et al. | 428/339 |
| 2010/0209185 | A1 * | 8/2010 | Kirth | F16G 11/00 403/292 |
| 2011/0031348 | A1 * | 2/2011 | Thompson | B64C 25/12 244/102 R |
| 2011/0111172 | A1 * | 5/2011 | Gideon et al. | 428/138 |
| 2012/0040169 | A1 | 2/2012 | Boursier | |
| 2013/0119191 | A1 * | 5/2013 | Wolfe | B29C 70/42 244/54 |
| 2013/0189478 | A1 * | 7/2013 | Fisher et al. | 428/114 |

FOREIGN PATENT DOCUMENTS

| | | | | |
|---|---|---|---|---|
| DE | 102010017062 | | 11/2011 | |
| EP | 916477 | A1 * | 5/1999 | |
| EP | 1167001 | A1 * | 1/2002 | B29C 70/16 |
| FR | 2501571 | A * | 9/1982 | |
| GB | 2092697 | A * | 8/1982 | F16B 5/02 |
| GB | 2098123 | A * | 11/1982 | B29C 47/027 |
| JP | 58211415 | A * | 12/1983 | |
| JP | 60088729 | U * | 6/1985 | |
| JP | 61047241 | A * | 3/1986 | |
| JP | 03030916 | A * | 2/1991 | |
| JP | 04362329 | A * | 12/1992 | F16F 1/18 |
| JP | 06285989 | A * | 10/1994 | |
| JP | 10166380 | A * | 6/1998 | B29C 43/18 |
| JP | 2002097746 | A * | 4/2002 | |
| JP | 2005231112 | A * | 9/2005 | B29B 11/16 |
| JP | 2005324340 | A * | 11/2005 | B32B 5/28 |
| JP | 2008200866 | A * | 9/2008 | |
| WO | WO 8502891 | A1 * | 7/1985 | B60G 11/12 |
| WO | WO 2006044315 | A2 * | 4/2006 | B29C 70/08 |
| WO | WO 2009142291 | A1 * | 11/2009 | B29C 43/50 |

OTHER PUBLICATIONS

Machine Translation of WO 2009142291 A1, Nov. 2009.*
Machine Translation of JP 2005324340 A, Nov. 2005.*
English Translation of JP 04362329 A, Dec. 1992.*
Machine Translation of JP 10166380 A, Jun. 1998.*
Machine Translation of EP 916477 A1, May 1999.*
Trailer Sauce, "Trailer Suspension", Mar. 2015.*

* cited by examiner

OVER-MOLDING OF LOAD-BEARING COMPOSITE STRUCTURES

BACKGROUND OF THE INVENTION

1. Field of the Invention

The present invention relates generally to composite structures that are used in load-bearing applications. More particularly, the present invention is directed to reinforcing the portion of the load-bearing composite structure that is connected to the body or sub-structure that also participates in carrying the load.

2. Description of Related Art

Composite materials typically include fibers and a resin matrix as the two principal components. Composite materials typically have a rather high strength to weight ratio. As a result, composite materials are being used in demanding environments, such as in the field of aerospace where the high strength and relatively light weight of composite parts are of particular importance.

The fibers used in many load-bearing composite structures or elements are unidirectional and continuous. Such unidirectional fibers are particularly useful when the load-bearing structure is relatively long with respect to the width and thickness of the structure. Wing spars, struts, links, frames, intercostals, beams, skins, panels, jet engine blades and vanes are examples of various aircraft structures that can be relatively long and which are designed to carry significant loads.

A major design consideration involves determining how to attach the load-bearing structure or element to the aircraft body or other support structure. In general, the load-bearing structure is bolted or otherwise securely attached to the aircraft body at one or more points along the load-bearing structure. The precise fit needed for a structural joint often requires machining the contact surfaces of the adjoining parts. This presents a problem with respect to load-bearing structures that are made from unidirectional composite materials because such materials are difficult to machine without initiating interlaminar cracks (between the UD plies) that can result in fatigue failure. Another issue is that to be structurally effective, the load-bearing structure often needs to be orthotropic with a majority of fibers oriented in one direction based on the major overall load that is carried by the load-bearing structure. Bearing stresses resulting from bolted joints, however, are better handled by multi-directional fiber orientations, such as quasi-isotropic laminate. Locally reinforcing a load-bearing structure with multi-directional plies to handle bearing stresses is a design challenge and is time consuming and expensive, once in production.

One approach to solving the problem presented by load-bearing structures that are weakened by machining is to simply add more multi-directional plies of unidirectional fiber to the entire structure at the connection location. However, the amount of unidirectional fiber material that must be added in order to raise localized bearing strength can significantly increase the weight and size of the load-bearing structure.

Other reinforcement systems, such as metal brackets and sleeves have been used to increase the strength of the load-bearing structure at the machined connection or attachment points. However these types of reinforcements tend to be bulky, heavy and expensive. In addition, the use of metal brackets and sleeves can create localized stress points at the connection site which can negatively affect the long-term strength of the joint.

Although the reinforcement systems presently being used to strengthen the connection point between unidirectional fiber load-bearing elements and aircraft support structures are adequate, there still is a continuing need to develop improved connection reinforcements which are as lightweight and small as possible while still providing adequate structural strength at the connection site.

SUMMARY OF THE INVENTION

In accordance with the present invention, it was discovered that an especially effective way to reinforce the connection sites on unidirectional fiber load-bearing structures is to over-mold the connection site with a structural molding material comprising discontinuous fibers and a resin matrix. It was discovered that the resulting composite structure that is composed of the unidirectional fiber element and the over-molded connection element provides an extremely strong connection between the load-bearing structure and the aircraft body. The connection element is molded by compression molding, thus all of its surfaces are controlled by the closed molds used for this process, which is highly desirable to ensure a tight connection with the adjoining structure. In addition, the over-molded connection element can be machined to provide a variety of connection orientations and even tighter tolerances without sacrificing the structural strength of the connection element since, unlike unidirectional fiber composite, discontinuous fiber molding materials are not susceptible to delamination from machining.

In accordance with the present invention, a composite structure is provided for connection to a support body or structure. The composite structure includes a load-bearing element that is made up of continuous reinforcing fibers and a resin matrix. The load-bearing element has an attachment portion for connection to the support body. The composite structure further includes a connection element that is formed using a molding material which is composed of discontinuous fibers and a resin matrix. The molding material is molded over the surface of the attachment portion of the load-bearing element.

As a feature of the present invention, the surface area of the attachment portion of the load-bearing element includes holes or notches that effectively increase the surface area over which the connection element is molded. It was discovered that the discontinuous fibers and resin matrix of the molding material flow into the holes or notches during molding to provide an especially effective interlock between the load-bearing element and the connection element.

As a further feature of the invention, the connection elements can be machined to include holes and other mounting surfaces without significantly reducing the strength of the connection element and without invading the load-bearing element. The ability to machine the connection element is due to the random orientation of the discontinuous fibers, as opposed to the continuous fibers used in the load-bearing element.

The present invention also covers methods for making the over-molded composite structure and methods for connecting the composite structure to support bodies, such as an aircraft body or other aerospace vehicle. In addition, the invention covers the assembled composite structure and support body. In particular, aircraft and other aerospace vehicles that include the composite structure attached therein are covered by this invention.

The above described and many other features and attendant advantages of the present invention will become better understood by reference to the following detailed description when taken in conjunction with the accompanying drawings.

DETAILED DESCRIPTION OF THE INVENTION

Figure 1:
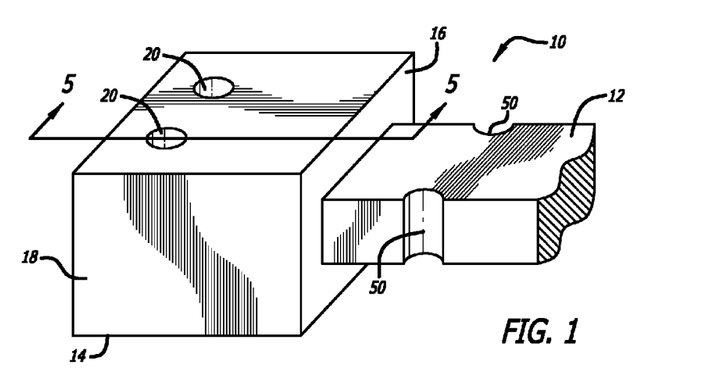
FIG. 1 depicts an exemplary composite structure in accordance with the present invention for connection to a support body or structure.

An exemplary composite structure in accordance with the present invention is shown generally at 10 in FIG. 1. The composite structure 10 includes a load-bearing element 12 and a connection element 14. The connection element of 14 includes a first portion 16 which is molded over the load-bearing element 12. The connection element 14 also includes a second portion 18 which includes holes 20 for connecting composite structure 10 to a support structure or body of the aircraft. Exemplary load-bearing elements include wing spars, propeller blades, struts, floor beams, various links including blocker door links, frames, intercostals, beams, skins, panels, jet engine blades and vanes including outer guide vanes and fan blades.

Figure 2:
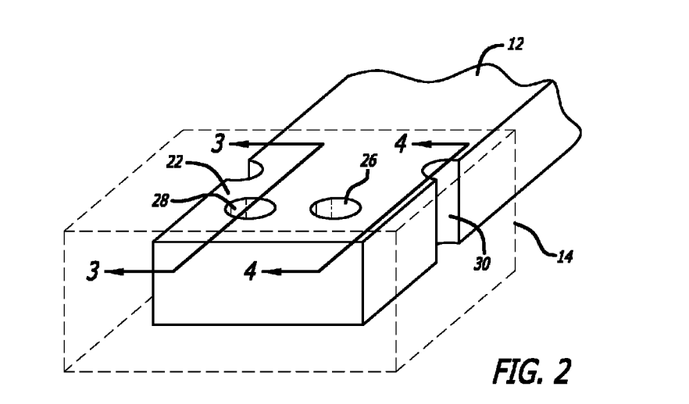
FIG. 2 shows details of the end portion of the load-bearing element. The connection element is shown in phantom.

As shown in the FIG. 2, the load-bearing element 12 includes an attachment portion 22 over which the connection element (shown in phantom) is molded. Bond-enhancement surfaces are added to the attachment portion 22 in order to provide an increase in the surface area that is available for bonding to the connection element 14 and to also lock the connection element to the load-bearing element. For example, holes 26 and 28 are provided in the attachment portion 22. The holes 26 and 28 not only increase the surface area that is available for bonding between the connection element 14 and attachment portion 22, but they also provide an efficient way to lock the connection element 14 to the attachment and 22.

Figure 3:
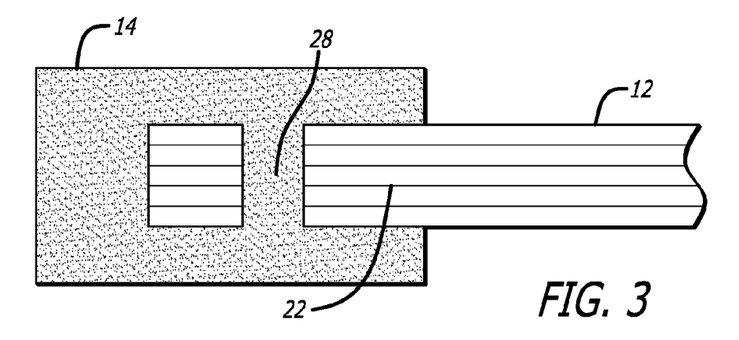
FIG. 3 is a sectional view of FIG. 2 which shows details of the hole through the end portion of the load-bearing element which is filled with discontinuous fibers and resin during molding of the connection element to the load-bearing element.

FIG. 3 is a sectional view of FIG. 2 which shows that the discontinuous fibers and resin of the molding material used to form the connection element flow completely through the hole or opening 28 in order to provide a secure a locking mechanism between the load-bearing element and connection element.

Figure 4:
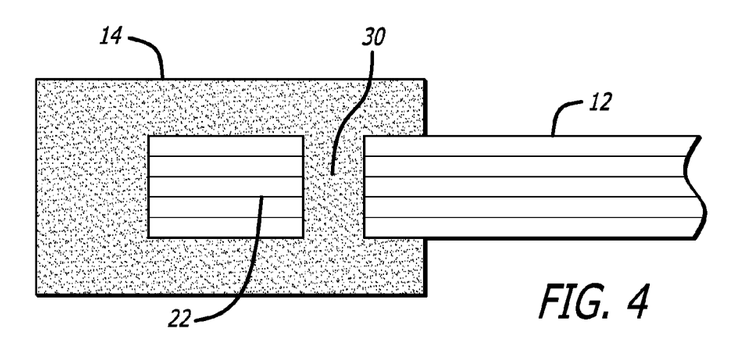
FIG. 4 is a sectional view of FIG. 2 which shows details of the groove in the end portion of the load-bearing element which is filled with discontinuous fibers and resin during the molding process.

Another exemplary type of bond-enhancement surface is the groove 30, as shown in FIG. 2. The groove 30 functions in the same manner as holes 26 and 28 to not only increase the surface area that is available for bonding between the connection element 14 and attachment portion 22, but the groove also provides another efficient way to lock the load-bearing element to the connection element. FIG. 4 is a sectional view of FIG. 2 which shows that the discontinuous fibers and resin of the molding material used to form the connection element flow completely into the groove 30 in order to provide a secure locking mechanism between the load-bearing element and connection element as well as providing additional surface area for bonding between the two elements.

The number of holes and grooves that are placed in the attachment portion to provide bond-enhancement surfaces can be varied depending upon the particular load-bearing element and the intended loads being carried at the joint. The holes and/or grooves should be sufficiently large to allow the molding material to flow completely through the holes and/or grooves so that the molding material located on both sides of the load-bearing element are connected together through the whole or groove. The holes 26, 28 and groove 30 shown in FIG. 2 are cylindrical in shape. However a wide variety of other surface shapes are possible depending upon design requirements. The holes and grooves may have square or rectangular cross-sections, triangular cross-sections or other polygonal cross-sectional shapes, as well as elliptical cross-sections and randomly shaped cross-sections. The cross-sectional shape and minimum size of the hole or groove is limited by the ability of the molding material to fill the opening completely during the molding process as well as structural design considerations.

The molding material is composed of discontinuous fibers in a resin matrix. This type of molding material is commonly referred to as a random discontinuous fiber composite (DFC). A preferred molding material is composed of randomly oriented segments of unidirectional tape that are impregnated with resin. This type of a discontinuous fiber/resin molding material is commonly referred to as quasi-isotropic chopped prepreg. Quasi-isotropic chopped prepreg is a form of random discontinuous fiber composite that is available commercially from Hexcel Corporation (Dublin, Calif.) under the trade name HexMC®. HexMC® molding material has been used for a variety of purposes including aerospace articles and high-strength molds. For examples, see U.S. Pat. Nos. 7,510,390; 7,960,674 and U.S. patent application Ser. No. 12/856,210.

Figure 5:
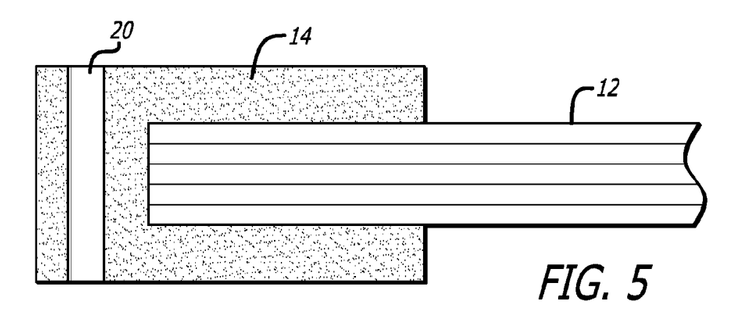
FIG. 5 is a sectional view of FIG. 1 showing details of a mounting hole that extends through the second portion of the connection element for connecting the composite structure to the support body or a bracket or other connector on the support body.

Quasi-isotropic (Q-I) chopped prepreg is composed of segments or "chips" of unidirectional fiber tape and a resin matrix. Q-I chopped prepreg is typically supplied as a mat made up of randomly oriented chips of chopped unidirectional tape prepreg. The UD tape prepreg that is chopped to form the chips or segments includes a resin matrix that can be any of the resins that are commonly used in aerospace prepregs. Thermosetting epoxy resins that are toughened with thermoplastics are preferred because they tend to be more resistant to fracturing or delamination when the connection element is machined after molding in order to provide attachment surfaces such as the attachment holes 20 as shown in FIGS. 1 and 5. Although holes 20 are shown as an exemplary attachment surface for connecting the connection element to a support structure or body, there are a number of other attachment surfaces that can be formed by molding or machining of the connection element. For example, an advantage of the present invention is that grooves and other types of indentations may be machined or molded into the surface of the connection element in order to provide a locking engagement of the connection element to matching surfaces on the support structure. This feature is useful for connecting loadbearing elements to their respective support structures by way of an inter-locking connection instead of using a bolt or other fastener-based attachment configuration.

In addition, it should be noted that the attachment holes 20, or other connection configuration, do not have to be located in a portion of the connection element 14 that is separated from the load-bearing element 12. For example, the attachment holes 20 can be located so that they pass through both the load-bearing element 12 and the connection element 14. In this configuration, the second portion 18 of the connection element 14 is merged together with the first portion 16 at the same location over the load-bearing element 12. Accordingly, it will be understood that the attachment holes 20, as shown in FIG. 5, are only exemplary for those situations where it is desirable to not have bolt holes extending through the load-bearing element 12. Further, the first and second portions 16 and 18 can occupy the same physical location over the load-bearing element 12, especially in those situations where it is desired that the bolt, or other type of fastener, be connected directly to the load-bearing element 12.

The resin matrix of the molding material may be composed of any of the thermosetting or thermoplastic resins that are typically used for structural applications. Preferably, the amount of uncured resin matrix will be between 25 to 45 weight percent of the overall weight of the molding material. The resin matrix may be any of the epoxy resins, bismaleimide resins, polyimide resins, polyester resins, vinylester resins, cyanate ester resins, phenolic resins or thermoplastic resins that are used in structural composite materials. Exemplary thermoplastic resins include polyphenylene sulfide (PPS), polysulfone (PS), polyetheretherketone (PEEK), polyetherketoneketone (PEKK), polyethersulfone (PES), polyetherimide (PEI), polyamide-imide (PAI). Epoxy resins that are toughened with a thermoplastic, such as PES, PEI and/or PAI, are preferred resin matrices. Resins that are typically present in UD tape of the type used in the aerospace industry are preferred. Exemplary thermoplastic toughened resins that are suitable for use as the resin matrix are described in U.S. Pat. Nos. 7,754,322 and 7,968,179 and U.S. patent application Ser. No. 12/764,636.

The resin content of the UD chips that are used to make the molding material may also be varied between 25 and 45 weight percent of the total prepreg weight. Chips with resin contents of between 35 and 40 weight percent are preferred. No additional resin is typically added to the prepreg chips when forming the quasi-isotropic chopped prepreg. The resin present in the initial UD tape prepreg is sufficient to bond the chips together to form the molding material.

The quasi-isotropic (Q-I) chopped prepreg can be made by purchasing or making unidirectional prepreg tape or tows of desired width. The tape or tow is then chopped into chips of desired length and the chips are laid randomly in layers and pressed together to form the molding material. When pressed together, the individual randomly oriented UD prepreg chips inherently bond together due to the presence of the prepreg resin. However, the preferred method for obtaining the molding material is to purchase HexMC® or equivalent commercially available quasi-isotropic chopped prepregs, which are supplied as sheets of material that are then used as a molding material to form the desired connection element, which is molded over the load-bearing element.

Other types of discontinuous fiber molding materials may be used to form the connection element provided that they meet the necessary strength and machinability requirements for connecting load-bearing elements to support structures. Such molding materials typically include randomly oriented chopped fibers which are impregnated with resin. However, in order to ensure that the molding material is sufficiently strong and both moldable and machinable, it is preferred that chopped unidirectional fibers or tape is used. The UD fibers may contain anywhere from a few hundred filaments to 12,000 filaments or more. UD fibers are typically supplied as a tape made up of continuous fiber in a unidirectional orientation.

UD tape is the preferred type of prepreg that is used to form the molding material. Unidirectional tape is available from commercial sources or it may be fabricated using known prepreg formation processes. The dimensions of the UD tape may be varied widely depending upon the particular connection being made. For example, the width of the UD tape (the dimension perpendicular to the UD fibers) may range from 0.2 cm to 2.5 cm or more. The tape will typically be from 0.004 to 0.012 inch (0.01 to 0.03 cm) thick and the length of the UD tape (the dimension parallel to the UD fibers) may vary from 0.5 inch (1.3 cm) up to 2 inches (5.1 cm) or more depending upon the sizes and shapes of the load-bearing element and desired connection element, as well as the size and shape of any bond-enhancement surfaces and the structural load requirements for the joint. The chips include unidirectional fibers that can be carbon, glass, aramid, polyethylene or any of the fibers types that are commonly used in the aerospace industry. Carbon fibers are preferred. The chips are randomly oriented in the mat and they lay relatively flat. This provides the mat with its transverse isotropic properties.

An exemplary preferred quasi-isotropic chopped prepreg material is HexMC® 8552/AS4. This quasi-isotropic chopped prepreg material is supplied as a continuous roll of a mat that is 46 cm wide and 0.20 cm thick. HexPly® 8552/AS4 unidirectional fiber prepreg is used to make the chips that are randomly oriented in the quasi-isotropic mat. HexPly® 8552/AS4 prepreg is a carbon fiber/epoxy unidirectional tape that is 0.016 cm thick and has a fiber areal weight of about 145 grams/square meter. The resin content of the tape is 38 weight percent with the resin (8552) being a thermoplastic-toughened epoxy. The tape is slit to provide 0.85 cm strips and chopped to provide chips that are 5 cm long. The chip density is about 1.52 gram/cubic centimeter. When using this type of molding material, the diameter of holes 26 and 28 should be at least ⅛ inch (0.32 cm) in diameter to ensure that the holes fill completely with molding material during high pressure molding.

Other exemplary quasi-isotropic chopped prepreg can be made using other HexPly® unidirectional prepreg tape, such as EMC 116/AS4 (epoxy/carbon fiber), 8552/IM7 (thermoplastic-toughened epoxy/carbon fiber), 3501-6/T650 (epoxy/carbon fiber) and M21/IM7 (thermoplastic-toughened epoxy/carbon fiber). M21/IM7 is a preferred unidirectional prepreg tape which may be chopped and used to form discontinuous fiber molding material for use in forming connection elements in accordance with the present invention.

The load-bearing elements 12 is preferably made from unidirectional fibers which will vary in size and type depending upon the particular type of load-bearing element being made. The unidirectional fibers may be in the form of a prepreg tow or tape or they may be dry UD fibers that are impregnated with resin during formation of the load-bearing element. The same types of fibers and resins that are used to form the molding material may also be used in forming the load-bearing element. The difference being that the unidirectional fibers in the load-bearing element are continuous and uniformly oriented in a unidirectional fashion.

It is preferred that the load-bearing element be fully formed and cured prior to over-molding of the attachment portion with molding material. However, it is possible to over-mold a load-bearing element which has not been fully cured, if desired. The procedures and processes for forming load-bearing elements from unidirectional fibers and a resin matrix are known. Although not necessary, it is preferred that the same resin that is used to form the loadbearing element is also used as the resin in the molding material when the molding material and load-bearing element are co-cured. The holes and grooves that are used to form bond-enhancement surfaces are preferably machined into the fully cured load-bearing element. However, if desired, the bond-enhancement surfaces may be formed in the load-bearing element during layup and curing/molding.

The connection element is preferably molded over the cured load-bearing element using conventional high pressure molding procedures. Typical high-pressure curing temperatures for epoxy resins used in the molding material range from 170° C. to 225° C. Preferred curing temperatures range from 190° C. to 205° C. Internal pressures within the mold are preferably above 500 psi and below 2000 psi at the cure temperatures. In a preferred embodiment, the connection element is first shaped into a "pre-form" which has a shape that approximates the final connection element. The pre-form is fabricated in position over the attachment end of the load-bearing element or it can be formed prior to being located in position over the attachment portion of the load-bearing element. Once the pre-form has been completely cured (typically 5 minutes to 1 hour at curing temperature), the over-molded load-bearing element is removed from the mold and cooled. If required, the connection element is then machined to provide holes or other surfaces for attachment to the support structure.

Preferably, the pre-form is "staged" prior to being placed in the mold in order to increase the viscosity of the resin to help maintain the pre-form shape and keep the pre-form in position during subsequent high pressure molding. Staging involves heating the pre-form at ambient pressure to a temperature of 165° C. to 180° C. for just enough time to substantially increase the viscosity of the resin. Staging times on the order of 5 to 15 minutes at the staging temperature are preferred. The staged pre-form is preferably cooled to room temperature prior to being placed in the mold for final curing. In addition, the viscosity of the resin in the pre-form tends to drop as the pre-form is heated to cure temperature and then rapidly increases as the resin cures. This drop in viscosity combined with pressurization of the mold ensures that the resin and discontinuous fibers flow uniformly into the holes and grooves that form the bond-enhancement surfaces.

Figure 8:
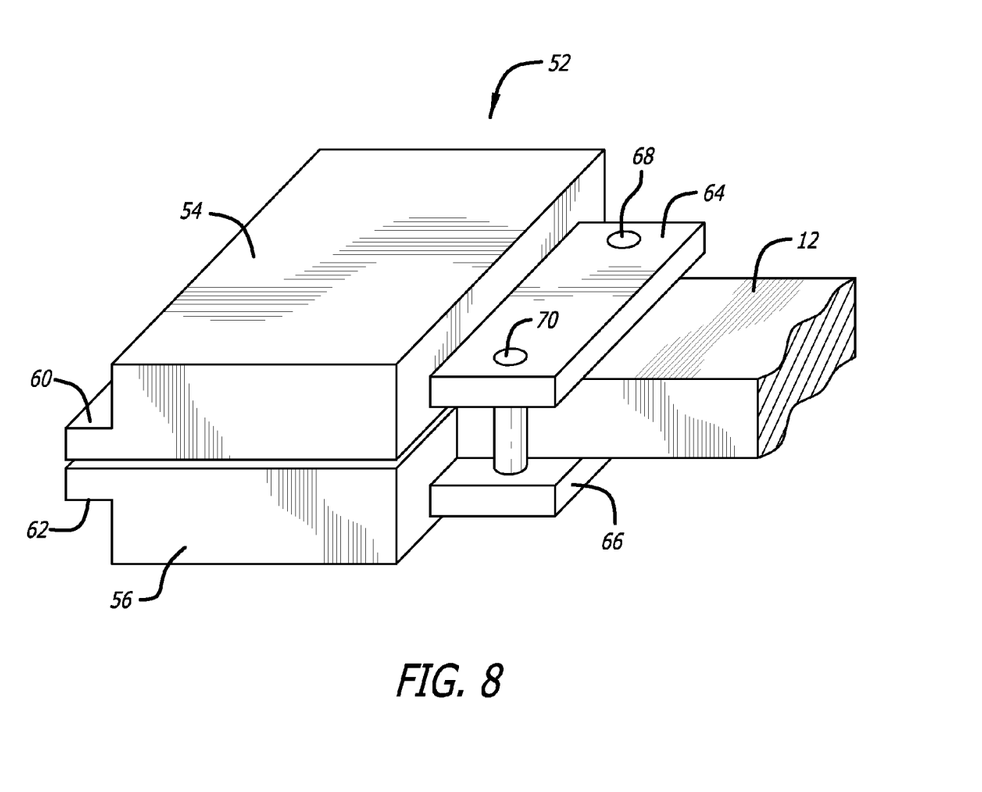
FIG. 8 shows an exemplary simplified mold that is shown being held in place using notches in the load-bearing element.

It is important that the mold be held securely in place during the over-molding operation. This is a particular problem when high pressures are used, since the mold tends to be blown off the end of the load-bearing structure unless it is securely held in place. In accordance with the present invention, it is preferred that locking surfaces or structures be provided on the loadbearing structure in order to secure it within the mold. For example, grooves 50 are located in the sides of the load-bearing structure in order to provide a surface to secure it during molding. Referring to FIG. 8, a simplified mold 52 is shown in place on the load-bearing element 12. The mold includes an upper half 54 and a lower half 56 which are clamped together on one end using clamping surfaces 60 and 62.

The mold halves 54 and 56 include locking tabs and 64 and 66 which include holes through which locking pins 68 and 70 are inserted for engagement with the grooves 50 in the load-bearing element 12. This particular locking configuration was found to provide extremely secure locking of the mold to the loadbearing element without unduly impacting the load-bearing capabilities of the structure 12. The size of the grooves 50 shown in FIG. 1 is relatively large with respect to the size of the load-bearing element for demonstrative purposes only. Typically, the grooves 50 will be relatively small with respect to the overall size of the loadbearing structure. The particular size of locking grooves will vary depending upon the size of the loadbearing structure, the molding pressure being used and the size of the over molded connection element. In all cases, the size of the grooves is chosen so that the overall structural properties of the loadbearing element still meet design criteria.

It was found that the nature of the molding material is such that only a relatively small amount of resin escapes from the mold along the mold seams and where the mold meets the loadbearing structure. To keep escape of a resin from the mold at a minimum, it is preferred that the gaps between the mold halves and the gaps between the mold and the load-bearing structure be on the order of 0.010 inch or less and more preferably 0.005 inch or less.

A number of other locking configurations may be used to secure the mold to the load-bearing structure. For example raised portions may be formed on the loadbearing structure that interlock with corresponding recessed surfaces formed in the locking tabs of the mold. In addition, grooves may be placed across the top and/or bottom of the loadbearing element for engagement with the mold instead of the grooves being located on the side, such as grooves 50. It is only important that the locking structure that is formed on or in the loadbearing structure be sufficiently strong to provide a secure connection between the mold and the load-bearing element to prevent the two from being forced apart during high pressure molding.

Figure 6:
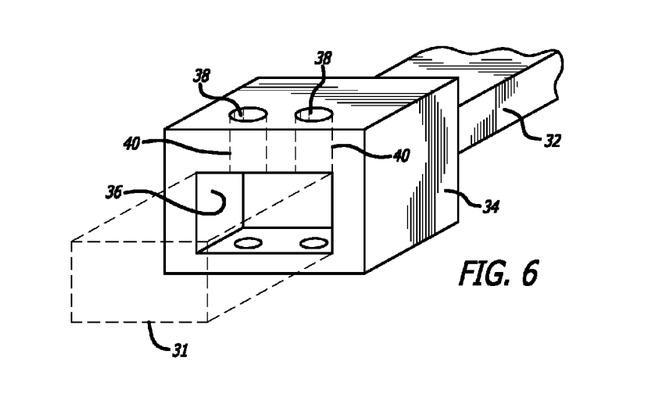
FIG. 6 shows an exemplary composite structure in which the connection element has been machined or molded to provide an opening into which the support body or a connector for the support body is inserted.

Referring to FIG. 6, a simplified composite structure in accordance with the present invention is shown connected to a simplified support body or structure, which is shown in phantom at 31. The load-bearing element 32 has been over-molded with the connection element 34. In this particular embodiment, the connection element 34 includes an opening 36 which has been machined or molded into the connection element 34 in order to receive the support structure 31. In addition, openings 38 have been machined or molded into the connection element 34 to provide joining of the support structure 31 to the connection element 34 utilizing bolts or pins that are shown in phantom at 40.

Figure 7:
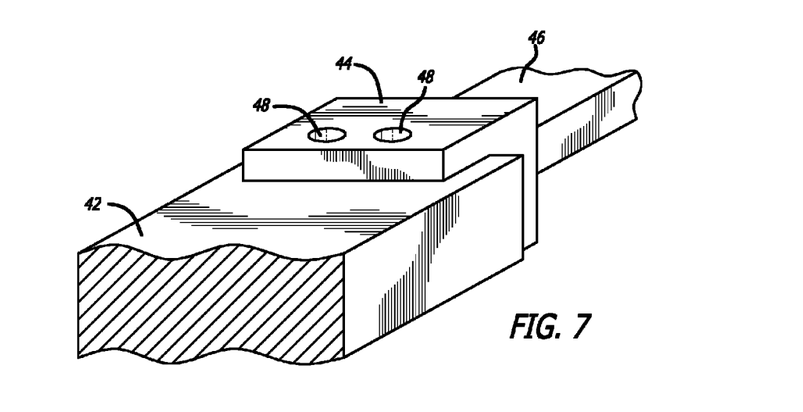
FIG. 7 shows an exemplary assembly in which the connection element is mounted within a notch in the support body or connector for the support body.

An alternate exemplary type of joint is shown in FIG. 7 where the support body or structure 42 to has been machined or molded to receive the connection element 44. The connection element 44 has been molded over the attachment and of the load-bearing element 46. Attachment openings 48 have been machined or molded into the connection element 44 in order to provide bolting of the connection element 44 to the support structure 42. A wide variety of possible connections between a wide variety of support structures and connection elements are possible. The simplified embodiments shown in FIGS. 6 and 7 are exemplary only. The actual support structure will typically be a rather complex shape that is formed using a combination of molding or casting and machining depending upon the type of material used to form the support structure. Typical materials used in such high-strength situations include a variety of steels, aluminum and composite materials.

The typical over-molded connection element will also be a more complex shape and structure than the simplified representation shown in FIGS. 6 and 7. The over molding of the load-bearing element with a molding material in accordance with the present invention provides the dual benefits of strengthening the loadbearing element while also providing a secure and strong connection between the load-bearing element and the support structure. In addition, the molded connection element can be both molded and machined to form the complex shapes required for connection to the support structure.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:

1. An assembly comprising a composite structure connected to a support body, said assembly comprising:
    1) said composite structure comprising:
        a) a load-bearing element comprising continuous reinforcing fibers and a resin matrix, said load bearing and a resin matrix, said load-bearing element having an attachment portion for connection to said support body, said attachment portion comprising an end surface having an end surface area, a first side surface having a first side surface area, a second side surface having a second side surface area, a top surface having a top surface area, and a bottom surface having a bottom surface area, said attachment portion comprising at least one bond enhancement surface that provides an increase in surface area of said attachment portion said bond-enhancement surface defining a hole in said attachment portion, said hole having a diameter;
        b) a connection element comprising a plurality of chips comprising unidirectional fibers in a resin matrix wherein said chips have a size defined by the width, length, and thickness of said chips, said connection element comprising a first portion that is molded over said end surface area, said first side surface area, said second side surface area, said top surface area, and said bottom surface area so that said attachment portion of said load-bearing element is embedded in said connection element and wherein the size of said is such that said hole in said attachment portion is substantially filled with said chips, said connection element comprising a second portion for connection to said support body wherein the second portion of said connection element comprises at least two non-parallel surfaces that have been machined to provide at least two non-parallel machined mating surfaces for connecting said composite structure directly to said support body; and
    2) said support body comprising at least two non-parallel mating surfaces that are in direct mating contact with said corresponding at least two non-parallel machined mating surfaces of said connection element wherein at least two non-parallel machined mating surfaces form a machined connection surface to which said support body has been attached for direct mating engagement and wherein the second portion of said connection element further comprising a machined connection pin surface defining a hole that has been machined into said second portion and wherein said support body comprises a connection pin surface defining a hole in said support body that is aligned with the machined connection pin surface in said connection element, said assembly further comprising a connection pin having a surface, said connection pin being located in the aligned holes of said connection element and support body such that the surface of said connection pin is in direct contact with the machined connection pin surface of the second portion of said connection element.

2. An assembly according to claim 1 wherein said continuous reinforcing fibers are unidirectional.

3. An assembly according to claim 1 wherein the width of said chips is from 0.2 to 2.5 centimeters, the length of said chips is from 1.3 to 5.1 centimeters and the thickness is from 0.01 to 0.03 centimeters.

4. An assembly according to claim 1 wherein said continuous reinforcing fibers are carbon fibers and said chips comprise unidirectional carbon fibers.

5. An assembly according to claim 4 wherein said resin matrix in said load-bearing element and said resin matrix in said connection element are both a thermoplastic-toughened epoxy resin.

6. An assembly according to claim 3 wherein said resin matrix in said load-bearing element and said resin matrix in said connection element are both a thermoplastic-toughened epoxy resin and wherein said continuous reinforcing fibers are carbon fibers and said chips comprise unidirectional carbon fibers.

7. An assembly according to claim 1 wherein said machined connection surface forms an opening in said second portion into which said support body has been inserted.

8. An assembly according to claim 1 wherein said support body is part of an aircraft.

9. An assembly according to claim 8 wherein said load-bearing element is a wing spar, propeller blade, strut, floor beam, blocker door link, frame, intercostal, aircraft skin, aircraft panel, jet engine blade or jet engine vane.

10. A method for making an assembly comprising a composite structure connected to a support body, said method comprising the steps of:
    1) providing said composite structure comprising:
        a) a load-bearing element comprising continuous reinforcing fibers and a resin matrix, said load bearing and a resin matrix, said load-bearing element having an attachment portion for connection to said support body, said attachment portion comprising an end surface having an end surface area, a first side surface having a first side surface area, a second side surface having a second side surface area, a top surface having a top surface area, and a bottom surface having a bottom surface area, said attachment portion comprising at least one bond enhancement surface that provides an increase in surface area of said attachment portion said bond-enhancement surface defining a hole in said attachment portion, said hole having a diameter;
        b) a connection element comprising a plurality of chips comprising unidirectional fibers in a resin matrix wherein said chips have a size defined by the width, length, and thickness of said chips, said connection element comprising a first portion that is molded over said end surface area, said first side surface area, said second side surface area, said top surface area, and said bottom surface area so that said attachment portion of said load-bearing element is embedded in said connection element and wherein the size of said is such that said hole in said attachment portion is substantially filled with said chips, said connection element comprising a second portion for connection to said support body wherein the second portion of said connection element comprises one or more surfaces that have been machined to provide at least two non-parallel machined mating surfaces for connecting said composite structure directly to said support body and wherein the second portion of said connection element further comprises a machined connection pin surface defining a hole that has been machined into the second portion;

2) providing said support body comprising at least two non-parallel mating surfaces and a connection pin surface defining a hole in said support body;

3) connecting said support body to the machined connection surface of said connection element so that said at least two non-parallel mating surfaces of said support body are in direct mating contact with said at least two non-parallel machined mating surfaces of said connection element 4) aligning the connection pin surface in said support body with the machined connection pin surface in said connection element;

5) providing a connection pin having a surface; and 6) locating said connection pin in the aligned holes of said connection element and support body such that the surface of said connection pin is in direct contact with the machined connection pin surface of the second portion of said connection element.

11. A method for making an assembly composite structure according to claim 10 wherein said continuous reinforcing fibers are unidirectional.

12. A method for making an assembly according to claim 10 wherein the width of said chips is from 0.2 to 15 centimeters, the length of said chips is from 1.3 to 5.1 centimeters and the thickness is from 0.01 to 0.03 centimeters.

13. A method for making an assembly according to claim 10 wherein said continuous reinforcing fibers are carbon fibers and said chips comprise unidirectional carbon fibers.

14. A method for making an assembly according to claim 13 wherein said matrix resin in said load-bearing element and said resin matrix in said connection element are both a thermoplastic-toughened epoxy resin.

15. A method for making an assembly according to claim 12 wherein said resin matrix in said load-bearing element and said resin matrix in said connection element are both a thermoplastic-toughened epoxy resin and wherein said continuous reinforcing fibers are carbon fibers and said chips comprise unidirectional carbon fibers.

16. A method for making an assembly according to claim 10 wherein said machined connection surface forms an opening in said second portion into which said support body has been inserted.

17. A method for making an assembly according to claim 10 wherein said support body is part of an aircraft.

18. A method for making an assembly according to claim 17 wherein said load-bearing element is a wing spar, propeller blade, strut, floor beam, blocker door link, frame, intercostal, aircraft skin, aircraft panel, jet engine blade or jet engine vane.

* * * * *